United States Patent
Eoff et al.

(10) Patent No.: US 7,207,387 B2
(45) Date of Patent: *Apr. 24, 2007

(54) METHODS AND COMPOSITIONS FOR USE WITH SPACER FLUIDS USED IN SUBTERRANEAN WELL BORES

(75) Inventors: Larry S. Eoff, Duncan, OK (US); B. Raghava Reddy, Duncan, OK (US); Eldon D. Dalrymple, Duncan, OK (US)

(73) Assignee: Halliburton Energy Services, Inc., Duncan, OK (US)

(*) Notice: Subject to any disclaimer, the term of this patent is extended or adjusted under 35 U.S.C. 154(b) by 361 days.

This patent is subject to a terminal disclaimer.

(21) Appl. No.: 10/893,210

(22) Filed: Jul. 16, 2004

(65) Prior Publication Data

US 2005/0230116 A1    Oct. 20, 2005

Related U.S. Application Data

(63) Continuation-in-part of application No. 10/862,132, filed on Jun. 4, 2004, and a continuation-in-part of application No. 10/825,001, filed on Apr. 15, 2004, now Pat. No. 7,114,568.

(51) Int. Cl.
*E21B 33/16* (2006.01)
*E21B 33/138* (2006.01)

(52) U.S. Cl. .................. 166/291; 166/295; 175/72; 507/219; 507/224; 507/225; 507/226; 507/928

(58) Field of Classification Search ............... 166/291, 166/295; 175/72; 507/219, 224, 225, 226, 507/928; 523/130
See application file for complete search history.

(56) References Cited

U.S. PATENT DOCUMENTS

| | | | |
|---|---|---|---|
| 2,863,832 A | 12/1958 | Perrine ...................... 252/8.55 |
| 2,910,436 A | 10/1959 | Fatt et al. .................. 252/8.55 |
| 3,215,199 A | 11/1965 | Dilgren ....................... 166/38 |
| 3,251,415 A | 5/1966 | Bombardieri et al. ......... 166/42 |
| 3,271,307 A * | 9/1966 | Dickson et al. .......... 166/280.1 |
| 3,297,090 A | 1/1967 | Dilgren ....................... 166/38 |
| 3,307,630 A | 3/1967 | Dilgren et al. ................ 166/38 |
| 3,382,924 A | 5/1968 | Veley et al. .................. 166/42 |
| 3,434,971 A | 3/1969 | Atkins ....................... 252/8.55 |
| 3,441,085 A | 4/1969 | Gidley ....................... 166/307 |
| 3,451,818 A | 6/1969 | Wareham ........................ 96/78 |
| 3,744,566 A | 7/1973 | Szabo et al. ................ 166/275 |
| 3,910,862 A | 10/1975 | Barabas et al. ..... 260/79.3 MU |
| 4,129,183 A | 12/1978 | Kalfoglou ................... 166/300 |
| 4,142,595 A | 3/1979 | Anderson et al. ............. 175/72 |
| 4,152,274 A | 5/1979 | Phillips et al. .............. 876/296 |
| 4,158,521 A | 6/1979 | Anderson et al. ........... 405/264 |
| 4,158,726 A | 6/1979 | Kamada et al. ............. 526/200 |
| 4,228,277 A * | 10/1980 | Landoll ....................... 536/90 |
| 4,299,710 A | 11/1981 | Dupre et al. ............. 252/8.5 A |
| 4,366,071 A | 12/1982 | McLaughlin et al. .. 252/8.55 R |
| 4,366,072 A | 12/1982 | McLaughlin et al. .. 252/8.55 R |
| 4,366,073 A | 12/1982 | McLaughlin et al. .. 252/8.55 R |
| 4,366,074 A | 12/1982 | McLaughlin et al. .. 252/8.55 R |
| 4,374,739 A | 2/1983 | McLaughlin et al. .. 252/8.55 R |
| 4,393,939 A | 7/1983 | Smith et al. ................ 166/293 |
| 4,395,340 A | 7/1983 | McLaughlin ........... 252/8.55 D |
| 4,401,789 A | 8/1983 | Gideon ....................... 524/827 |
| 4,439,334 A | 3/1984 | Borchardt .............. 252/8.55 D |
| 4,440,649 A | 4/1984 | Loftin et al. ............. 252/8.5 C |
| 4,447,342 A | 5/1984 | Borchardt et al. ..... 252/8.55 D |
| 4,460,627 A | 7/1984 | Weaver et al. .............. 427/212 |
| 4,462,718 A | 7/1984 | McLaughlin et al. ....... 405/264 |
| 4,532,052 A | 7/1985 | Weaver et al. ......... 252/8.55 R |
| 4,536,297 A | 8/1985 | Loftin et al. ............. 252/8.5 C |
| 4,536,303 A | 8/1985 | Borchardt .............. 252/8.55 R |
| 4,536,305 A | 8/1985 | Borchardt et al. ..... 252/8.55 R |
| 4,552,670 A | 11/1985 | Lipowski et al. ........... 704/553 |
| 4,554,081 A | 11/1985 | Borchardt et al. ....... 252/8.5 A |

(Continued)

FOREIGN PATENT DOCUMENTS

DE    2 250 552    4/1974

(Continued)

OTHER PUBLICATIONS

U.S. Appl. No. 10/763,800, filed Jan. 24, 2004, Eoff et al.

(Continued)

*Primary Examiner*—George Suchfield
(74) *Attorney, Agent, or Firm*—Robert A. Kent; Fletcher, Yoder & Van Someren

(57) ABSTRACT

The present invention relates to spacer fluids used in subterranean operations and, more particularly, to spacer fluids that comprise water-soluble relative permeability modifiers and methods of using the spacer fluids in subterranean operations. In one embodiment, the present invention provides a method of displacing a first fluid from a well bore that comprises introducing the first fluid into the well bore; and displacing the first fluid with a spacer fluid, the spacer fluid comprising water, and a water-soluble relative permeability modifier comprising a hydrophobically modified polymer or a hydrophilically modified polymer. In another embodiment, the present invention provides a spacer fluid that comprises water, and a water-soluble relative permeability modifier comprising a hydrophobically modified polymer or a hydrophilically modified polymer.

38 Claims, No Drawings

U.S. PATENT DOCUMENTS

| | | | |
|---|---|---|---|
| 4,563,292 A | 1/1986 | Borchardt | 252/8.55 R |
| 4,604,216 A | 8/1986 | Irvin et al. | 252/8.51 |
| 4,627,926 A | 12/1986 | Peiffer et al. | 252/8.55 R |
| 4,671,883 A | 6/1987 | Connell | 252/8.515 |
| 4,693,639 A | 9/1987 | Hollenbeak et al. | 405/263 |
| 4,699,722 A | 10/1987 | Dymond et al. | 252/8.551 |
| 4,702,319 A * | 10/1987 | Bock et al. | 166/275 |
| 4,730,028 A | 3/1988 | Bock et al. | 526/225 |
| 4,814,096 A | 3/1989 | Evani | 252/8.554 |
| 4,828,726 A | 5/1989 | Himes et al. | 252/8.553 |
| 4,959,432 A | 9/1990 | Fan et al. | 526/287 |
| 5,071,934 A | 12/1991 | Peiffer | 526/307 |
| 5,097,904 A | 3/1992 | Himes | 166/294 |
| 5,146,986 A | 9/1992 | Dalrymple | 166/294 |
| 5,160,642 A | 11/1992 | Schield et al. | 252/8.551 |
| 5,197,544 A | 3/1993 | Himes | 166/294 |
| 5,208,216 A | 5/1993 | Williamson et al. | 507/120 |
| 5,244,042 A | 9/1993 | Dovan et al. | 166/270 |
| 5,271,466 A | 12/1993 | Harms | 166/300 |
| 5,342,530 A | 8/1994 | Aften et al. | 252/8.551 |
| 5,379,841 A | 1/1995 | Pusch et al. | 166/295 |
| 5,382,371 A | 1/1995 | Stahl et al. | 507/221 |
| 5,597,783 A | 1/1997 | Audibert et al. | 507/120 |
| 5,607,902 A | 3/1997 | Smith et al. | 507/120 |
| 5,637,556 A | 6/1997 | Argillier et al. | 507/120 |
| 5,646,093 A | 7/1997 | Dino | 507/209 |
| 5,669,456 A | 9/1997 | Audibert et al. | 175/72 |
| 5,720,347 A | 2/1998 | Audibert et al. | 166/294 |
| 5,728,653 A | 3/1998 | Audibert et al. | 507/222 |
| 5,735,349 A | 4/1998 | Dawson et al. | 166/295 |
| 5,887,653 A | 3/1999 | Bishop et al. | 166/281 |
| 5,944,106 A | 8/1999 | Dalrymple et al. | 166/281 |
| 5,972,848 A | 10/1999 | Audibert et al. | 507/119 |
| 5,979,557 A | 11/1999 | Card et al. | 166/300 |
| 6,020,289 A | 2/2000 | Dymond | 507/120 |
| 6,070,664 A | 6/2000 | Dalrymple et al. | 166/281 |
| 6,124,245 A | 9/2000 | Patel | 507/120 |
| 6,187,839 B1 | 2/2001 | Eoff et al. | 523/130 |
| 6,228,812 B1 | 5/2001 | Dawson et al. | 507/221 |
| 6,237,687 B1 | 5/2001 | Barbee, Jr. et al. | 166/278 |
| 6,253,851 B1 | 7/2001 | Schroeder, Jr. et al. | 166/278 |
| 6,277,900 B1 | 8/2001 | Oswald et al. | 523/130 |
| 6,283,210 B1 | 9/2001 | Soliman et al. | 166/270 |
| 6,359,047 B1 | 3/2002 | Thieu et al. | 524/376 |
| 6,364,016 B1 | 4/2002 | Dalrymple et al. | 166/270 |
| 6,380,137 B1 | 4/2002 | Heier et al. | 507/121 |
| 6,476,169 B1 | 11/2002 | Eoff et al. | 523/307.2 |
| 6,476,283 B1 | 11/2002 | Devore et al. | 585/250 |
| 6,497,283 B1 | 12/2002 | Eoff et al. | 166/293 |
| 6,516,885 B1 | 2/2003 | Munday | 166/295 |
| 6,569,983 B1 | 5/2003 | Treybig et al. | 528/102 |
| 6,609,578 B2 | 8/2003 | Patel et al. | 175/64 |
| 6,627,719 B2 | 9/2003 | Whipple et al. | 774/325 |
| 6,710,107 B2 | 3/2004 | Audibert et al. | 524/5 |
| 6,787,506 B2 | 9/2004 | Blair et al. | 507/222 |
| 6,803,348 B2 | 10/2004 | Jones et al. | 507/221 |
| 6,855,672 B2 | 2/2005 | Poelker | 507/225 |
| 2003/0019627 A1 | 1/2003 | Qu et al. | 166/281 |
| 2003/0104948 A1 | 6/2003 | Poelker et al. | 507/100 |
| 2003/0191030 A1 | 10/2003 | Blair et al. | 507/225 |
| 2004/0045712 A1 | 3/2004 | Eoff et al. | 166/293 |
| 2004/0102331 A1 | 5/2004 | Chan et al. | 507/100 |
| 2004/0171495 A1 | 9/2004 | Zamora et al. | 507/100 |
| 2004/0220058 A1 | 11/2004 | Eoff et al. | 507/200 |
| 2004/0229756 A1 | 11/2004 | Eoff et al. | 507/219 |
| 2004/0229757 A1 | 11/2004 | Eoff et al. | 507/219 |
| 2005/0000694 A1 | 1/2005 | Dalrymple et al. | 166/307 |
| 2007/0012445 A1 | 1/2007 | Nguyen et al. | |

FOREIGN PATENT DOCUMENTS

| | | |
|---|---|---|
| EP | 0 383 337 A2 | 8/1990 |
| EP | 0 896 122 A2 | 2/1999 |
| EP | 1 033 378 A1 | 9/2000 |
| EP | 1 193 365 A1 | 4/2002 |
| EP | 1 312 753 A1 | 5/2003 |
| GB | 2 221 940 A | 2/1990 |
| GB | 2335428 A | 9/1999 |
| WO | WO 93/15164 | 8/1993 |
| WO | WO 99/49183 | 9/1999 |
| WO | WO 99/50530 | 10/1999 |
| WO | WO 2000/78890 | 12/2000 |
| WO | WO 02/097236 A1 | 12/2002 |
| WO | WO 2003/056130 | 7/2003 |
| WO | WO 04/101706 A1 | 11/2004 |
| WO | WO 2004/094781 | 11/2004 |

OTHER PUBLICATIONS

U.S. Appl. No. 10/780,995, filed Feb. 18, 2004, Eoff et al.

U.S. Appl. No. 10/806,894, filed Mar. 23, 2004, Eoff et al.

U.S. Appl. No. 10/825,001, filed Apr. 15, 2004, Eoff et al.

U.S. Appl. No. 10/872,997, filed Jun. 21, 2004, Eoff et al.

U.S. Appl. No. 10/881,198, filed Jun. 29, 2004, Dalrymple et al.

Botermans, C. Wouter, et al, *Relative Permeability Modifiers: Myth or Reality?*, SPE eLibrary Paper No. 68973, 2001, Society of Petroleum Engineers, Inc., presented at SPE European Formation Damage Conference, The Hague, The Netherlands, May 21-22, pp. 1-2, printed from website @ http://speonline.spe.org/cgi-bin/viewpaper.cgi?paper=00068973.pdf.

Eoff, Larry, et al, *Structure and Process Optimization for the Use of a Polymeric Relative-Permeability Modifier in Conformance Control*, SPE eLibrary Paper No. 64985, 2001, Society of Petroleum Engineers, Inc., presented at SPE International Symposium on Oilfield Chemistry, Houston, TX, Feb. 13-16, pp. 1-2, printed from website @ http://speonline.spe.org/cgi-bin/viewpaper.cgi?paper=00064985.pdf.

Inikori, Solomon Ovueferaye, *Numerical Study of Water Coning Control with Downhole Water Sink (DWS) Well Completions in Vertical and Horizontal Wells*, A Dissertation, Aug. 2002, Title Page, Contents, Abstract and pp. 17-18, Submitted to the Graduate Faculty of the Louisiana State University and Agricultural and Mechanical College, The Department of Petroleum Engineering.

Zhou, Z. J., et al, *Controlling Formation Damage Using Clay Stabilizers: A Review,* Paper 95-71, The Petroleum Society of CIM, 1995, presented at the 46th Annual Technical Meeting of the Petroleum Society of CIM in Banff, Alberta, Canada, May 14-17.

Halliburton, 2001 Press Releases, *Halliburton Technology Uses Revolutionary Polymer System to Control Unwanted Water Production*, 2002 Halliburton, pp. 1-2, printed from website @ www.halliburton.com/news/archive/2001/esgnws_053101.jsp?printMe.

Halliburton, 2001 Press Releases, *First Halliburton H2Zero™ Conformance Solution Job Performed for a Producing Well in Egypt*, 2002 Halliburton, pp. 1-2, printed from website @ www.halliburton.com/news/archive/2001/esgnws_111901.jsp.

Halliburton, 2001 Press Releases, *Halliburton Performs First H2Zero™ Conformance Solution Job in North America*, 2002 Halliburton, pp. 1-2, printed from website @ www.halliburton.com/news/archive/2001/esgnws_082201.jsp.

BJ Services Company, *Aquacon, Product Information*, Aug. 1, 2001, pp. 1-2.

BJ Services Company, *Aquatrol I, Product Information*, Dec. 14, 2000, pp. 1-2.

Botermans, C. Wouter, et al, *Relative Permeability Modifiers: Myth or Reality?*, SPE No. 68973, 2001, Society of Petroleum Engineers, Inc., presented at SPE European Formation Damage Conference, The Hague, The Netherlands, May 21-22, pp. 1-13 (previously listed as website address, SPE eLibrary).

Eoff, Larry, et al, *Structure and Process Optimization for the Use of a Polymeric Relative-Permeability Modifier in Conformance Control*, SPE No. 64985, 2001, Society of Petroleum Engineers, Inc., presented at SPE International Symposium on Oilfield Chemistry, Houston, TX, Feb. 13-16, pp. 1-14 (previously listed as website address, SPE eLibrary).

U.S. Appl. No. 10/893,210, filed Jul. 16, 2004, Eoff et al.

U.S. Appl. No. 11/102,062, filed Apr. 8, 2005, Sierra et al.

Xu, et al.., Modeling of Laser Spallation Drilling of Rocks for Gas-and Oilwell Drilling, SPE 95746, 2005.

Gahan, et al., Effect of Downhole Pressure Conditions on High-Power Laser Perforation, SPE 97093, 2005.

Gahan et al., Analysis of Efficient High-Power Fiber Lasers of Well Perforation, SPE 90661, 2004.

Parker, et al., Well Perforation Using High-Power Lasers, SPE 84418, 2003.

Parker, et al., Laser Drilling: Effects of Beam Application Methods on Improving Rock Removal, SPE 84353, 2003.

Bai, et al., Improved Determination of Stree-Dependent Permeability for Anisotropic Formations, SPE 78188, 2002.

Proett, et al., Advanced Permeability and Anisotropy Measurements While Testing and Sampling in Real-Time Using a Dual Probe Formation Tester, SPE 62919, 2000.

Proett, et al., Advanced Dual Probe Formation Tester with Transient, Harmonic, and Pulsed Time-Delay Testing Methods Determines Permeability, Skin and ANisotropy, SPE 64650, 2000.

* cited by examiner

METHODS AND COMPOSITIONS FOR USE WITH SPACER FLUIDS USED IN SUBTERRANEAN WELL BORES

CROSS-REFERENCE TO RELATED APPLICATIONS

This application is a continuation-in-part of U.S. application Ser. No. 10/862,132 entitled "Compositions and Methods of Stabilizing Subterranean Formations Containing Reactive Shale," filed on Jun. 4, 2004, and U.S. application Ser. No. 10/825,001 entitled "Hydrophobically Modified Polymers for a Well Completion Spacer Fluid," filed on Apr. 15, 2004, now U.S. Pat. No. 7,114,568.

BACKGROUND

The present invention relates to spacer fluids used in subterranean operations and, more particularly, to spacer fluids that comprise water-soluble relative permeability modifiers and methods of using the spacer fluids in subterranean operations.

Spacer fluids are fluids used to displace one fluid present in a well bore before the introduction of another fluid into the well bore. For example, while drilling a well bore in a subterranean formation, a drilling fluid, which may be oil-based or water-based, may be circulated through a drill bit and then back to the surface, thereby lubricating the drill string and removing cuttings from the well bore. The drilling fluid, however, may dehydrate or lose filtrate to the formation so that the fluid remaining in the annulus gels and/or increases in viscosity whereby some of the fluid may be deposited against the formation face as a layer of solids and gelled drilling fluid known as "filter cake." Further, when the well bore is drilled to the desired depth, another fluid, such as a slurry containing a cement composition, may be pumped into the annular space between the walls of the well bore and the pipe string or casing. In this process, known as "primary cementing," the cement composition sets in the annulus, supporting and positioning the casing, and forming a substantially impermeable barrier, or cement sheath, which isolates the casing from subterranean zones (e.g., zonal isolation). The bond between the set cement composition and the well bore is crucial to achieving effective zonal isolation.

A spacer fluid may be used to displace one fluid, such as a drilling fluid, in a well bore before entry into the well bore of another fluid, such as a cement composition. Among other things, spacer fluids may be used to enhance solids removal during drilling operations, to enhance displacement efficiency, and/or to physically separate chemically incompatible fluids. For example, in primary cementing, the cement composition may be separated from the drilling fluid and partially dehydrated drilling fluid may be removed from the walls of the well bore by pumping a spacer fluid into the well bore between the drilling fluid and the cement composition. In addition, spacer fluids may be placed between different drilling fluids, for example, during drilling fluid change outs, or between a drilling fluid and a completion brine.

It is understood that the well bore may pass through sections of the subterranean formation that produce water. Besides being generally undesirable during the production phase of a well, water-producing sections may cause problems in the well bore with certain completion activities. Recently, wells in the production phase have been treated with compounds to reduce the production of water with hydrocarbons. These compounds are commonly referred to as "relative permeability modifiers." Relative permeability modifiers, such as polyacrylamide, may be dissolved in water and pumped into a subterranean formation that produces water and hydrocarbons, thereby reducing the permeability of the subterranean formation to water with little or no effect on the permeability of the subterranean formation with respect to hydrocarbons. It is generally desirable, however, to curb water production as early as possible in the life of a well.

SUMMARY

The present invention relates to spacer fluids used in subterranean operations and, more particularly, to spacer fluids that comprise water-soluble relative permeability modifiers and methods of using the spacer fluids in subterranean operations.

In one embodiment, the present invention provides a method of displacing a first fluid from a well bore that comprises introducing the first fluid into the well bore; and displacing the first fluid with a spacer fluid, the spacer fluid comprising water, and a water-soluble relative permeability modifier comprising a hydrophobically modified polymer.

In another embodiment, the present invention provides a method of displacing a first fluid from a well bore that comprises introducing the first fluid into the well bore; and displacing the first fluid with a spacer fluid, the spacer fluid comprising water, and a water-soluble relative permeability modifier comprising a hydrophilically modified polymer.

In another embodiment, the present invention provides a spacer fluid that comprises water, and a water-soluble relative permeability modifier comprising a hydrophobically modified polymer or a hydrophilically modified polymer.

The features and advantages of the present invention will be readily apparent to those skilled in the art upon a reading of the description of the detailed description that follows.

DETAILED DESCRIPTION

The present invention relates to spacer fluids used in subterranean operations and, more particularly, to spacer fluids that comprise water-soluble relative permeability modifiers and methods of using the spacer fluids in subterranean operations.

The spacer fluids of the present invention generally comprise water and a water-soluble relative permeability modifier. As used herein, "water-soluble" refers to at least 0.01 weight percent soluble in distilled water. Other additives suitable for use in subterranean operations may be added to the spacer fluids of the present invention as desired.

The water used in the spacer fluids of the present invention may be fresh water, saltwater (e.g., water containing one or more salts dissolved therein), brine (e.g., saturated saltwater), or seawater. Generally, the water may be from any source provided that it does not contain an excess of compounds that may adversely affect other components in the spacer fluid. Generally, the water is present in the spacer fluids of the present invention in an amount in the range of from about 45% to about 99.98% by volume of the treatment fluid. In some embodiments, the water is present in the spacer fluids in an amount in the range of from about 65% to about 75% by volume of the treatment fluid.

In some embodiments, the water-soluble relative permeability modifier comprises a hydrophobically modified polymer. As used herein, "hydrophobically modified" refers to the incorporation into the hydrophilic polymer structure of hydrophobic groups, wherein the alkyl chain length is from about 4 to about 22 carbons. In another embodiment, the water-soluble relative permeability modifier comprises a hydrophilically modified polymer. As used herein, "hydrophilically modified" refers to the incorporation into the hydrophilic polymer structure of hydrophilic groups.

In some embodiments, the spacer fluids of the present invention comprise a water-soluble relative permeability modifier, wherein the water-soluble relative permeability modifier comprises a hydrophobically modified polymer. The hydrophobically modified polymers of the present invention typically have a molecular weight in the range of from about 100,000 to about 10,000,000. In certain embodiments, the hydrophobically modified polymers may comprise a polymer backbone, the polymer backbone comprising polar heteroatoms. Generally, the polar heteroatoms present within the polymer backbone of the hydrophobically modified polymers include, but are not limited to, oxygen, nitrogen, sulfur, or phosphorous.

In certain embodiments of the present invention, the hydrophobically modified polymers may be a reaction product of a hydrophilic polymer and a hydrophobic compound. In some embodiments, a mole ratio of a hydrophilic monomer to the hydrophobic compound in the hydrophobically modified polymer is in the range of from about 99.98:0.02 to about 90:10, wherein the hydrophilic monomer is a calculated amount present in the hydrophilic polymer. The hydrophilic polymers suitable for forming the hydrophobically modified polymers of the present invention should be capable of reacting with hydrophobic compounds. Suitable hydrophilic polymers include, homo-, co-, or terpolymers such as, but not limited to, polyacrylamides, polyvinylamines, poly(vinylamines/vinyl alcohols), and alkyl acrylate polymers in general. Additional examples of alkyl acrylate polymers include, but are not limited to, polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(acrylamide/dimethylaminopropyl methacrylamide), poly(2-acrylamido-2-methyl propane sulfonic acid/dimethylaminoethyl methacrylate), poly (acrylic acid/dimethylaminopropyl methacrylamide), and poly(methacrylic acid/dimethylaminopropyl methacrylamide). In certain embodiments, the hydrophilic polymers contain reactive amino groups in the polymer backbone or as pendant groups, which are capable of reacting with hydrophobic compounds. Even further, in certain embodiments, the hydrophilic polymers comprise dialkyl amino pendant groups. Even further, in certain embodiments, the hydrophilic polymers comprise a dimethyl amino pendant group and at least one monomer comprising dimethylaminoethyl methacrylate or dimethylaminopropyl methacrylamide. In certain embodiments of the present invention, the hydrophilic polymers comprise a polymer backbone, the polymer backbone comprising polar heteroatoms, wherein the polar heteroatoms present within the polymer backbone of the hydrophilic polymers include, but are not limited to, oxygen, nitrogen, sulfur, or phosphorous. Suitable hydrophilic polymers that comprise polar heteroatoms within the polymer backbone include homo-, co-, or terpolymers, such as, but not limited to, celluloses, chitosans, polyamides, polyetheramines, polyethyleneimines, polyhydroxyetheramines, polylysines, polysulfones, gums, starches, and derivatives thereof. In one embodiment, the starch is a cationic starch. A suitable cationic starch may be formed by reacting a starch, such as corn, maize, waxy maize, potato, tapioca, and the like, with the reaction product of epichlorohydrin and trialkylamine.

The hydrophobic compounds that are capable of reacting with the hydrophilic polymers of the present invention include, but are not limited to, alkyl halides, sulfonates, sulfates, and organic acid derivatives. Examples of suitable organic acid derivatives include, but are not limited to, octenyl succinic acid; dodecenyl succinic acid; and anhydrides, esters, and amides of octenyl succinic acid or dodecenyl succinic acid. In some embodiments, the hydrophobic compounds may have an alkyl chain length of from about 4 to about 22 carbons. For example, where the hydrophobic compound is an alkyl halide, the reaction between the hydrophobic compound and hydrophilic polymer may result in the quaternization of at least some of the hydrophilic polymer amino groups with an alkyl halide, wherein the alkyl chain length is from about 4 to about 22 carbons.

In other embodiments, the hydrophobically modified polymers of the present invention may be the reaction product of a polymerization reaction of at least one hydrophilic monomer and at least one hydrophobically modified hydrophilic monomer. Examples of suitable methods of their preparation are described in U.S. Pat. No. 6,476,169, the relevant disclosure of which is incorporated herein by reference.

A variety of hydrophilic monomers may be used to form the hydrophobically modified polymers of the present invention. Examples of suitable hydrophilic monomers include, but are not limited to acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, methacrylic acid, vinyl caprolactam, N-vinylformamide, N,N-diallylacetamide, dimethyldiallyl ammonium halide, itaconic acid, styrene sulfonic acid, methacrylamidoethyltrimethyl ammonium halide, quaternary salt derivatives of acrylamide, and quaternary salt derivatives of acrylic acid.

A variety of hydrophobically modified hydrophilic monomers also may be used to form the hydrophobically modified polymers of the present invention. Examples of suitable hydrophobically modified hydrophilic monomers include, but are not limited to, alkyl acrylates, alkyl methacrylates, alkyl acrylamides, alkyl methacrylamides alkyl dimethylammoniumethyl methacrylate halides, and alkyl dimethylammoniumpropyl methacrylamide halides, wherein the alkyl groups have from about 4 to about 22 carbon atoms. In some embodiments, the hydrophobically modified hydrophilic monomer comprises octadecyldimethylammoniumethyl methacrylate bromide, hexadecyldimethylammoniumethyl methacrylate bromide, hexadecyldimethylammoniumpropyl methacrylamide bromide, 2-ethylhexyl methacrylate, or hexadecyl methacrylamide.

The hydrophobically modified polymers formed from the above-described polymerization reaction may have estimated molecular weights in the range of from about 100,000 to about 10,000,000 and mole ratios of the hydrophilic monomer(s) to the hydrophobically modified hydrophilic monomer(s) in the range of from about 99.98:0.02 to about 90:10. Suitable hydrophobically modified polymers having molecular weights and mole ratios in the ranges set forth above include, but are not limited to, acrylamide/octadecyldimethylammoniumethyl methacrylate bromide copolymer, dimethylaminoethyl methacrylate/hexadecyldimethylammoniumethyl methacrylate bromide copolymer, dimethylaminoethyl methacrylate/vinyl pyrrolidone/hexadecyldimethylammoniumethyl methacrylate bromide terpolymer and acrylamide/2-acrylamido-2-methyl propane sulfonic acid/2-ethylhexyl methacrylate terpolymer.

In another embodiment, the spacer fluids of the present invention comprise a water-soluble relative permeability modifier, wherein the water-soluble relative permeability modifier comprises a hydrophilically modified polymer. The hydrophilically modified polymers of the present invention typically have a molecular weight in the range of from about 100,000 to about 10,000,000. In one embodiment, the hydrophilically modified polymers comprise a polymer backbone, the polymer backbone comprising polar heteroatoms. Generally, the polar heteroatoms present within the polymer backbone of the hydrophilically modified polymers include, but are not limited to, oxygen, nitrogen, sulfur, or phosphorous.

In certain embodiments of the present invention, the hydrophilically modified polymers may be a reaction product of a hydrophilic polymer and a hydrophilic compound. The hydrophilic polymers suitable for forming the hydrophilically modified polymers of the present invention should be capable of reacting with hydrophilic compounds. Suitable hydrophilic polymers include homo-, co-, or terpolymers, such as, but not limited to, polyacrylamides, polyvinylamines, poly(vinylamines/vinyl alcohols), and alkyl acrylate polymers in general. Additional examples of alkyl acrylate polymers include, but are not limited to, polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly (acrylic acid/dimethylaminopropyl methacrylamide), and poly (methacrylic acid/dimethylaminopropyl methacrylamide). In certain embodiments, the hydrophilic polymers contain reactive amino groups in the polymer backbone or as pendant groups, which are capable of reacting with hydrophilic compounds. Even further, in certain embodiments, the hydrophilic polymers comprise dialkyl amino pendant groups. Even further, in certain embodiments, the hydrophilic polymers comprise a dimethyl amino pendant group and at least one monomer comprising dimethylaminoethyl methacrylate or dimethylaminopropyl methacrylamide. In some embodiments of the present invention, the hydrophilic polymers comprise a polymer backbone, the polymer backbone comprising polar heteroatoms, wherein the polar heteroatoms present within the polymer backbone of the hydrophilic polymers include, but are not limited to, oxygen, nitrogen, sulfur, or phosphorous. Suitable hydrophilic polymers comprising polar heteroatoms within the polymer backbone include homo-, co-, or terpolymers such as, but not limited to, celluloses, chitosans, polyamides, polyetheramines, polyethyleneimines, polyhydroxyetheramines, polylysines, polysulfones, gums, starches, and derivatives thereof. In one embodiment, the starch is a cationic starch. A suitable cationic starch may be formed by reacting a starch, such as corn, maize, waxy maize, potato, tapioca, and the like, with the reaction product of epichlorohydrin and trialkylamine.

The hydrophilic compounds suitable for reaction with the hydrophilic polymers include, but are not limited to, polyethers comprising halogens, sulfonates, sulfates, and organic acid derivatives. Examples of suitable polyethers include, but are not limited to, polyethylene oxides, polypropylene oxides, and polybutylene oxides, and copolymers, terpolymers, and mixtures thereof. In one embodiment, the polyether is an epichlorohydrin-terminated polyethylene oxide methyl ether.

The hydrophilically modified polymers formed from the reaction of a hydrophilic polymer and a hydrophilic compound may have estimated molecular weights in the range of from about 100,000 to about 10,000,000 and may have weight ratios of the hydrophilic polymers to the hydrophilic compounds in the range of from about 1:1 to about 10:1. Suitable hydrophilically modified polymers having molecular weights and weight ratios in the ranges set forth above include, but are not limited to, the reaction product of polydimethylaminoethyl methacrylate and epichlorohydrin-terminated polyethyleneoxide methyl ether; the reaction product of polydimethylaminopropyl methacrylamide and epichlorohydrin-terminated polyethyleneoxide methyl ether; and the reaction product of poly(acrylamide/dimethylaminopropyl methacrylamide) and epichlorohydrin-terminated polyethyleneoxide methyl ether. In one certain embodiment, the hydrophilically modified polymer is the reaction product of a polydimethylaminoethyl methacrylate and epichlorohydrin-terminated polyethyleneoxide methyl ether having a weight ratio of polydimethylaminoethyl methacrylate to epichlorohydrin-terminated polyethyleneoxide methyl ether of about 3:1.

Generally, the water-soluble relative permeability modifier of the present invention may be present in the spacer fluids in an amount sufficient to provide the desired level of water control. In some embodiments, the water-soluble relative permeability modifier may be present in the spacer fluids of the present invention in an amount in the range of from about 0.02% to about 10% by weight of the spacer fluid. In some embodiments, the water-soluble relative permeability modifier may be present in the spacer fluids of the present invention in an amount in the range of from about 0.05% to about 1% by weight of the spacer fluid.

Additional additives may be added to the spacer fluids of the present invention as deemed appropriate by one skilled in the art. Examples of suitable additives include, but are not limited to, viscosifying agents, fluid loss additives, salts, shale swelling inhibitors, weighting agents, and numerous other additives suitable for use in spacer fluids.

The spacer fluids of the present invention generally may be utilized as a buffer between two fluids during subterranean operations. For example, in some embodiments, the spacer fluids of the present invention may be pumped into a well bore between a first fluid and a second fluid. The first fluid should be displaced with the spacer fluid, and the spacer fluid should be displaced with the second fluid. Among other things, the spacer fluids of the present invention should be compatible with the fluid that it is displacing and the second fluid that is displacing the spacer fluid, in that there should be no undesirable interactions between the spacer fluid and the first or the second fluid. Generally, the first fluid may be any fluid that the spacer fluid should displace, such as drilling fluids. The second fluid may be any fluid desired to be introduced into the well bore, such as cement compositions, drilling fluids, completion brines, and the like. For example, during a drilling fluid change out, the second fluid may be a drilling fluid. It is believed that during normal leak off from the spacer fluids of the present invention into the subterranean formation, the water-soluble relative permeability modifier, among other things, may attach to surfaces within the subterranean formation. The presence of the water-soluble relative permeability modifiers in the subterranean formation may reduce the permeability of the treated sections of the subterranean formation to aqueousbased fluids (e.g., water) with little or no reduction in the permeability of the subterranean formation with respect to hydrocarbons. This may reduce the subsequent problems associated with water flowing into the well bore from the subterranean formation.

In one embodiment, the present invention provides a method of displacing a first fluid from a well bore that comprises introducing the first fluid into the well bore; and displacing the first fluid with a spacer fluid, the spacer fluid comprising water, and a water-soluble relative permeability modifier comprising a hydrophobically modified polymer.

In another embodiment, the present invention provides a method of displacing a first fluid from a well bore that comprises introducing the first fluid into the well bore; and displacing the first fluid with a spacer fluid, the spacer fluid comprising water, and a water-soluble relative permeability modifier comprising a hydrophilically modified polymer.

In another embodiment, the present invention provides a spacer fluid that comprises water, and a water-soluble relative permeability modifier comprising a hydrophobically modified polymer or a hydrophilically modified polymer.

To facilitate a better understanding of the present invention, the following examples of certain embodiments are given. In no way should the following examples be read to limit, or define, the scope of the invention.

EXAMPLES

Example 1

A water-soluble relative permeability modifier of the present invention was made by mixing 47.7 grams ("g") of deionized water, 0.38 g of (n-hexadecyl) dimethylammonium ethyl methacrylate bromide, and 1.1 g of acrylamide, and sparging with nitrogen for approximately 30 minutes. Thereafter, a polymerization initiator, such as 0.0127 g of 2,2'-azo bis(2-amidinopropane)dihydrochloride, was added. The resulting solution was then heated, with stirring, to 110° F. and held for 18 hours to produce a highly viscous polymer solution.

Example 2

A water-soluble relative permeability modifier of the present invention was made by mixing 41.2 g of deionized water, 0.06 g of octadecyl methacrylate, 0.45 g of cocoamidopropyl betaine surfactant, and 1.26 g of acrylamide. Thereafter, a polymerization initiator, such as 0.0127 g of 2,2'-azo bis (2-amidinopropane) dihydrochloride, was added. The resulting solution was then heated, with stirring, to 110° F. and held for 18 hours to produce a highly viscous polymer solution.

Example 3

A polymer was made by mixing 1968 g of deionized water, 105 g of dimethylaminoethyl methacrylate ("DMEMA") and sparging with nitrogen for 30 minutes. Thereafter, the pH was adjusted to approximately 7.9 with sulfuric acid and a polymerization initiator, such as 0.46 g of 2,2'-azo bis (2-amidinopropane) dihydrochloride, was added. The resulting solution was then heated, with stirring, to 110° F. and held for 18 hours to produce poly-DMEMA.

The poly-DMEMA was then hydrophobically modified by adding 71 g of poly-DMEMA to a 250 ml round flask, followed by 15% NaOH to achieve a pH of approximately 8.9. Next, 54.6 g of water, 0.36 g of C16 alkyl (n-hexadecyl) bromide, and 0.39 g of benzylcetyldimethylammonium bromide surfactant were added to quaternize the poly-DMEMA homopolymer and form a DMEMA-n-hexadecyl alkly-DMEMA copolymer. This mixture was then heated, with stirring, to 140° F. and held for 24 hours to produce a highly viscous polymer solution.

Example 4

Permeability reduction tests were performed at 200° F. using a Hassler sleeve containing a Berea brown sandstone core and having three pressure taps (as well as an inlet and an outlet for determining pressure), thereby dividing the core into four segments. The brine used in the permeability reduction tests contained 9% sodium chloride by weight and 1% calcium chloride by weight. The oil used in the permeability reduction tests was kerosene.

A sample fluid was prepared using a DMEMA-n-hexadecyl alkyl-DMEMA copolymer prepared as described in Example 3. The sample fluid comprised water, 2% potassium chloride by weight, and 0.6% of the DMEMA-n-hexadecyl alkyl-DMEMA copolymer by weight.

The following procedure was used for this series of tests. The core experiences a flow sequence of 1) brine, 2) oil, 3) brine, 4) sample fluid, and 5) brine. The first two flow steps (brine, oil) prepared the core for the test. In the third flow step, the brine was passed through the core until the pressure stabilized, and the initial permeability of the core was measured by determining the pressure at the pressure taps and outlet. The results are listed below in Table 1 as "Initial Core Permeability." Thereafter, the sample fluid was passed through the core. Next, the brine was passed through the core to determine the final permeability of the core after the treatment with the sample fluid. The results are listed below in Table 1 as "Final Core Permeability." The final core permeability was used to calculate a percentage reduction of water permeability according to the following formula:

$$\text{Percent Reduction of Water Permeability} = \left(1 - \left(\frac{\text{Final Core Permeability}}{\text{Initial Core Permeability}}\right)\right) \times 100$$

The results are tabulated below in Table 1 as "Percent Reduction of Water Permeability." The initial permeability and the final permeability are reported in millidarcy ("mD") units.

TABLE 1

|  | Initial Core Permeability (mD) | Final Core Permeability (mD) | % Reduction of Water Permeability |
|---|---|---|---|
| Total | 611 | 5 | 99 |
| Segment 1 | 642 | 12 | 98 |
| Segment 2 | 366 | 2 | 99 |
| Segment 3 | 1281 | 48 | 96 |
| Segment 4 | 869 | 222 | 74 |

Accordingly, this example indicates, inter alia, that a water-soluble relative permeability modifier of the present invention may reduce the permeability of a subterranean formation to water.

Example 5

A water-soluble relative permeability modifier of the present invention was made as follows. First, a polymer was made by mixing 45 g of dimethylaminoethyl methacrylate, 6.8 g acrylic acid, 372 g of water and sparging with nitrogen for 30 minutes. Thereafter, the pH was adjusted to approximately 5.3 with 5.7 mL of concentrated sulfuric acid, followed by the addition of 0.2 mL of 2-mercaptoethanol and 1.3 g of 2,2'-azo bis(2-amidinopropane)dihydrochloride. The resulting solution was then heated to 71° C., with stirring, and held for 18 hours to produce poly(dimethylaminoethyl methacrylate/acrylic acid).

The poly(dimethylaminoethyl methacrylate/acrylic acid) was then hydrophilically modified by adding 95 g of the polymer to a 250 mL roundbottom flask, followed by the addition of 5.7 g of a 65% solution of an epichlorohydrin-terminated polyethylene oxide methyl ether and 8.0 g of sodium chloride. Approximately 17 mL of 3% active sodium hydroxide solution was then added to reach a pH of approximately 8.2. The mixture was then heated, with stirring, to 71° C. The viscosity of the solution was monitored, and when the viscosity reached 2000 centipoise (as measured with a Brookfield LVT viscometer, #2 spindle at 12 rpm, 25° C.) the reaction was terminated by removing the heat source and adding 5 mL of 17% hydrochloric acid, 2.0 g sodium chloride, and 14.7 g water.

Therefore, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of displacing a first fluid from a well bore comprising:
    introducing the first fluid into the well bore; and
    displacing the first fluid with a spacer fluid, the spacer fluid comprising:
        water, and
        a water-soluble relative permeability modifier comprising a hydrophobically modified polymer, the hydrophobically modified polymer comprising a hydrophobically modified cationic starch.

2. The method of claim 1 wherein the first fluid comprises a drilling fluid.

3. The method of claim 1 further comprising displacing the spacer fluid with a second fluid.

4. The method of claim 3 wherein the second fluid is selected from the group consisting of a cement composition, a drilling fluid, and a completion brine.

5. The method of claim 1 wherein the hydrophobically modified polymer has a molecular weight in the range of from about 100,000 to about 10,000,000.

6. The method of claim 1 wherein the water-soluble relative permeability modifier is present in the spacer fluid in an amount in the range of from about 0.02% to about 10% by weight of the spacer fluid.

7. The method of claim 1 wherein the water-soluble relative permeability modifier is present in the spacer fluid in an amount in the range of from about 0.05% to about 1% by weight of the spacer fluid.

8. The method of claim 1 wherein the hydrophobically modified polymer comprises a polymer backbone, the polymer backbone comprising polar heteroatoms.

9. The method of claim 1 wherein the hydrophobically modified polymer comprises a reaction product of a hydrophilic polymer and a hydrophobic compound.

10. The method of claim 9 wherein the hydrophobically modified polymer has a mole ratio of a hydrophilic monomer to the hydrophobic compound in the range of from about 99.98:0.02 to about 90:10, wherein the hydrophilic monomer is a calculated amount present in the hydrophilic polymer.

11. The method of claim 9 wherein the hydrophilic polymer is a homopolymer, a copolymer, or a terpolymer.

12. The method of claim 9 wherein the hydrophilic polymer comprises a polymer backbone, the polymer backbone comprising polar heteroatoms.

13. The method of claim 9 wherein the hydrophobic compound is selected from the group consisting of an alkyl halide, a sulfonate, a sulfate, and an organic acid derivative.

14. The method of claim 13 wherein the organic acid derivative is selected from the group consisting of an octenyl succinic acid; a dodecenyl succinic acid; an anhydride of octenyl succinic acid; an ester of octenyl succinic acid; an amide of octenyl succinic acid; an anhydride of dodecenyl succinic acid; an ester of dodecenyl succinic acid; and an amide of dodecenyl succinic acid.

15. The method of claim 13 wherein the hydrophobic compound has an alkyl chain length of from about 4 to about 22 carbons.

16. The method of claim 9 wherein the hydrophilic polymer comprises a starch selected from the group consisting of a corn, a maize, a waxy maize, a potato, and a tapioca.

17. The method of claim 1 wherein the hydrophobically modified polymer comprises a reaction product of at least one hydrophilic monomer and at least one hydrophobically modified hydrophilic monomer.

18. The method of claim 17 wherein the hydrophobically modified polymer has a mole ratio of the at least one hydrophilic monomer to the at least one hydrophobically modified hydrophilic monomer in the range of from about 99.98:0.02 to about 90:10.

19. The method of claim 1 wherein the hydrophobically modified cationic starch comprises a starch selected from the group consisting of a corn, a maize, a waxy maize, a potato, and a tapioca.

20. The method of claim 1 wherein the hydrophobically modified cationic starch comprises a reaction product of a starch and a reaction product of epichlorohydrin and trialkylamine.

21. A method of displacing a first fluid from a well bore comprising:
    introducing the first fluid into the well bore; and
    displacing the first fluid with a spacer fluid, the spacer fluid comprising water, and a water-soluble relative permeability modifier comprising a hydrophobically modified polymer, the hydrophobically modified polymer comprising polar heteroatoms within the polymer backbone, wherein the hydrophobically modified polymer is essentially free of cellulose.

22. The method of claim 21 wherein the first fluid comprises a drilling fluid.

23. The method of claim 21 further comprising displacing the spacer fluid with a second fluid.

24. The method of claim 21 wherein the second fluid is selected from the group consisting of a cement composition, a drilling fluid, and a completion brine.

25. The method of claim 21 wherein the hydrophobically modified polymer has a molecular weight in the range of from about 100,000 to about 10,000,000.

26. The method of claim 21 wherein the water-soluble relative permeability modifier is present in the spacer fluid in an amount in the range of from about 0.02% to about 10% by weight of the spacer fluid.

27. The method of claim 21 wherein the water-soluble relative permeability modifier is present in the spacer fluid in an amount in the range of from about 0.05% to about 1% by weight of the spacer fluid.

28. The method of claim 21 wherein the hydrophobically modified polymer is a reaction product of a hydrophilic polymer and a hydrophobic compound.

29. The method of claim 28 wherein the hydrophobically modified polymer has a mole ratio of a hydrophilic monomer to the hydrophobic compound in the range of from about 99.98:0.02 to about 90:10, wherein the hydrophilic monomer is a calculated amount present in the hydrophilic polymer.

30. The method of claim 28 wherein the hydrophilic polymer is a homopolymer, a copolymer, or a terpolymer.

31. The method of claim 28 wherein the hydrophilic polymer is selected from the group consisting of a chitosan, a polyamide, a polyetheramine, a polyethyleneimine, a polyhydroxyetheramine, a polylysine, a polysulfone, a gum, a starch, and derivatives thereof.

32. The method of claim 28 wherein the hydrophilic polymer comprises a cationic starch.

33. The method of claim 28 wherein the hydrophilic polymer comprises a starch selected from the group consisting of a corn, a maize, a waxy maize, a potato, and a tapioca.

34. The method of claim 28 wherein the hydrophilic polymer comprises a reaction product of a starch and a reaction product of epichlorohydrin and trialkyl amine.

35. The method of claim 28 wherein the hydrophobic compound is selected from the group consisting of an alkyl halide, a sulfonate, a sulfate, and an organic acid derivative.

36. The method of claim 35 wherein the organic acid derivative is selected from the group consisting of an octenyl succinic acid, a dodecenyl succinic acid, an anhydride of octenyl succinic acid, an ester of octenyl succinic acid, an amide of octenyl succinic acid, an anhydride of dodecenyl succinic acid, an ester of dodecenyl succinic acid, and an amide of dodecenyl succinic acid.

37. The method of claim 28 wherein the hydrophobic compound has an alkyl chain length of from about 4 to about 22 carbons.

38. The method of claim 28 wherein the hydrophobically modified polymer is a reaction product of at least one hydrophilic monomer and at least one hydrophobically modified hydrophilic monomer.

* * * * *